US012335848B2

(12) United States Patent
Wang et al.

(10) Patent No.: US 12,335,848 B2
(45) Date of Patent: Jun. 17, 2025

(54) UPLINK CONTROL CHANNEL RESOURCE ALLOCATION

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Peter Gaal, San Diego, CA (US); John Edward Smee, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/453,735

(22) Filed: Nov. 5, 2021

(65) Prior Publication Data

US 2022/0086737 A1    Mar. 17, 2022

Related U.S. Application Data

(62) Division of application No. 16/244,857, filed on Jan. 10, 2019, now Pat. No. 11,172,430.

(Continued)

(51) Int. Cl.
*H04B 7/00* (2006.01)
*H04L 1/1607* (2023.01)
(Continued)

(52) U.S. Cl.
CPC ........... *H04W 48/12* (2013.01); *H04L 1/1607* (2013.01); *H04L 1/1614* (2013.01);
(Continued)

(58) Field of Classification Search
None
See application file for complete search history.

(56) References Cited

U.S. PATENT DOCUMENTS 8,687,652 B2    4/2014   Zhang et al.
10,939,501 B2 *  3/2021   Chatterjee ........... H04W 72/044
(Continued)

FOREIGN PATENT DOCUMENTS

| WO | 2009120888 | 10/2009 | |
|----|------------|---------|----|
| WO | 2012039570 A2 | 3/2012 | |
| WO | WO-2014024964 A1 * | 2/2014 | ............... H04L 1/00 |

OTHER PUBLICATIONS

International Search Report and Written Opinion—PCT/US2019/013176—ISA/EPO—Mar. 22, 2019.
(Continued)

*Primary Examiner* — Sithu Ko
(74) *Attorney, Agent, or Firm* — Harrity & Harrity, LLP

(57) ABSTRACT

Various aspects of the present disclosure generally relate to wireless communication. In some aspects, a user equipment may determine a resource allocation, from a resource set, for a response message using a resource allocation selection procedure. In some aspects, the user equipment may transmit the response message using the resource allocation and based at least in part on determining the resource allocation. In some aspects, the user equipment may determine, using an implicit resource mapping procedure and before a radio resource control connection establishment, a resource allocation for a redundancy scheme response message based at least in part on a remaining minimum system information (RMSI) value. Numerous other aspects are provided.

33 Claims, 11 Drawing Sheets

Related U.S. Application Data

(60) Provisional application No. 62/617,565, filed on Jan. 15, 2018, provisional application No. 62/616,932, filed on Jan. 12, 2018.

(51) Int. Cl.
    *H04L 1/1812*    (2023.01)
    *H04L 1/1829*    (2023.01)
    *H04L 1/1867*    (2023.01)
    *H04L 5/00*      (2006.01)
    *H04W 48/12*     (2009.01)
    *H04W 72/1273*   (2023.01)
    *H04W 72/0453*   (2023.01)

(52) U.S. Cl.
    CPC .......... *H04L 1/1812* (2013.01); *H04L 1/1861* (2013.01); *H04L 1/1896* (2013.01); *H04L 5/0055* (2013.01); *H04L 5/0057* (2013.01); *H04L 5/0094* (2013.01); *H04W 72/1273* (2013.01); *H04W 72/0453* (2013.01)

(56) References Cited

U.S. PATENT DOCUMENTS

| | | | |
|---|---|---|---|
| 11,121,828 B2* | 9/2021 | Xiong | H04L 5/0055 |
| 11,172,430 B2 | 11/2021 | Wang et al. | |
| 11,502,805 B2* | 11/2022 | Davydov | H04L 1/1861 |
| 2012/0263047 A1 | 10/2012 | Love et al. | |
| 2013/0223301 A1 | 8/2013 | Lee et al. | |
| 2013/0272258 A1 | 10/2013 | Lee et al. | |
| 2015/0103703 A1 | 4/2015 | Zeng et al. | |
| 2015/0110017 A1 | 4/2015 | Park et al. | |
| 2016/0345311 A1 | 11/2016 | Chen et al. | |
| 2018/0054280 A1 | 2/2018 | Fu et al. | |
| 2018/0295643 A1 | 10/2018 | Lee et al. | |
| 2018/0324773 A1* | 11/2018 | Fu | H04W 72/042 |
| 2019/0132093 A1 | 5/2019 | Aiba et al. | |
| 2019/0140804 A1* | 5/2019 | Tang | H04L 1/1685 |
| 2019/0141737 A1 | 5/2019 | Kim et al. | |
| 2019/0149379 A1* | 5/2019 | Xiong | H04L 5/006 370/329 |
| 2019/0230685 A1* | 7/2019 | Park | H04W 72/12 |
| 2019/0327755 A1* | 10/2019 | Xiong | H04L 5/0046 |
| 2019/0356524 A1* | 11/2019 | Yi | H04L 27/26025 |
| 2020/0236670 A1* | 7/2020 | Xiong | H04L 5/0016 |
| 2020/0280985 A1* | 9/2020 | Ijaz | H04W 72/0453 |
| 2021/0152292 A1* | 5/2021 | Fu | H04W 52/48 |

OTHER PUBLICATIONS

International Preliminary Report on Patentability—PCT/US2019/013176, the International Bureau of WIPO—Geneva, Switzerland, Jul. 23, 2020.

LG Electronics: "HARQ-ACK Payload Adaptation for Rel-13 CA", 3GPP Draft, R1-156850, ECA an Adaptation Final, 3rd Generation Partnership Project (3GPP), Mobile Competence Centre, 650, Route Des Lucioles, F-06921, Sophia-Antipolis Cedex, France , vol. RAN WG1, No. Anaheim, USA, Nov. 15-Nov. 22, 2015, Nov. 15, 2015 (Nov. 15, 2015), XP051003206, 10 pages. Retrieved from the Internet: URL:http://www.3gpp.org/ftp/Meetings_3GPP_SYNC/RAN1/Docs/.

NEC: "Resource Allocation for NR PUCCH", 3GPP Draft, 3GPP TSG RAN WG1 Meeting 91, R1-1720380 PUCCH_RESOURCE_ALLOCATION_V3E, 3rd Generation Partnership Project (3GPP), Mobile Competence Centre, 650, Route Des Lucioles, F-06921 Sophia-Antipolis Cedex, France, vol. RAN WG1, No. Reno, Nevada; Nov. 27-Dec. 1, 2017, Nov. 18, 2017, XP051369943, Retrieved from the Internet: URL:http://www.3gpp.org/ftp/tsg%5Fran/WG1%5FRL1/TSGR1%5F91/Docs/ [retrieved on Nov. 18, 2017], 8 pages.

Qualcomm Incorporated: "Resource Allocation for PUCCH," 3GPP Draft, 3GPP TSG RAN WG1 Meeting #91, R1-1720686 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Reno, US; Nov. 27-Dec. 1, 2017, Nov. 18, 2017, XP051370147, 22 pages, Retrieved from the Internet: URL: http://www.3gpp.org/ftp/tsg%5Fran/WG1%5FRL1/TSGR1%5F91/Docs/ [retrieved on Nov. 18, 2017].

Qualcomm Incorporated: "Resource Allocation for PUCCH," 3GPP Draft; R1-1713436 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 21-Aug. 25, 2017, Aug. 20, 2017, XP051316238, 6 Pages, Retrieved from the Internet: URL: http://www.3gpp.org/ftp/Meetings_3GPP_SYNC/RAN1/Docs/ [retrieved on Aug. 20, 2017].

Qualcomm Incorporated: "Resource Allocation for Pucch", 3GPP Draft, 3GPP TSG RAN WG1 Meeting #90b, R1-1718806 Resource Allocation for PUCCH, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9-Oct. 13, 2017, Oct. 8, 2017, XP051341951, 10 pages, Retrieved from the Internet: URL: http://www.3gpp.org/ftp/Meetings_3GPP_SYNC/RAN1/Docs/, [retrieved on Oct. 8, 2017], paragraph [0002].

POTEVIO: "Remaining Details of PUCCH Resource Allocation for EPDCCH", 3GPP Draft, 3GPP TSG RAN WG1 Meeting #70bis, R1-124300, 3rd Generation Partnership Project (3GPP), Mobile Competence Centre, 650, Route Des Lucioles, F-06921 Sophia-Antipolis Cedex, France, vol. RAN WG1, No. San Diego, USA, Oct. 8-Oct. 12, 2012, Sep. 29, 2012 (Sep. 29, 2012), XP050662200, 4 Pages, Retrieved from the Internet: URL: http://www.3gpp.org/ftp/tsg_ran/WG1_RL1/TSGR1_70b/Docs/ [Retrieved on Sep. 29, 2012].

Qualcomm Incorporated: "Resource Allocation for PUCCH", 3GPP TSG-RAN WG1 #88, R1-1702634, 3rd Generation Partnership Project (3GPP), Mobile Competence Centre, 650, Route Des Lucioles, F-06921, Sophia-Antipolis Cedex, France, vol. RAN WG1, No. Athens, Feb. 13-17, 2017, Feb. 12, 2017, XP051209785, Feb. 7, 2017, 2 Pages, Parts 1 and 2, Sections 1-3.

* cited by examiner

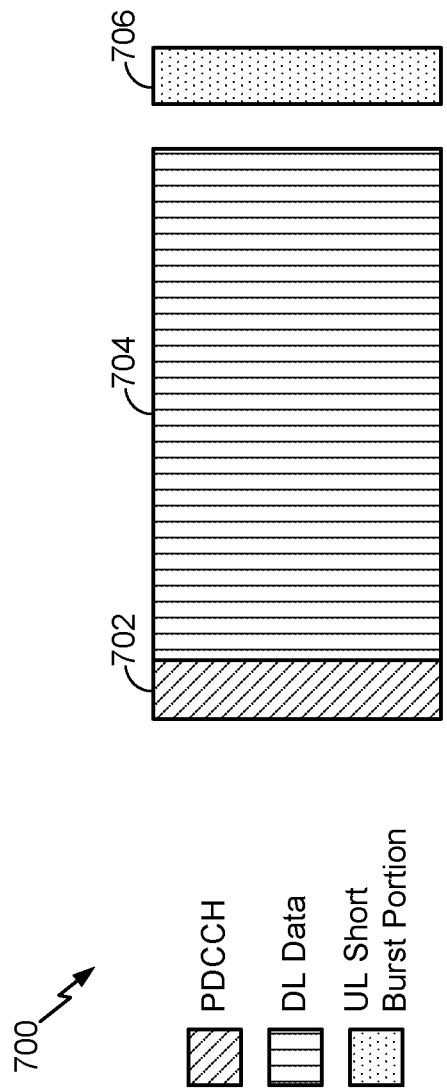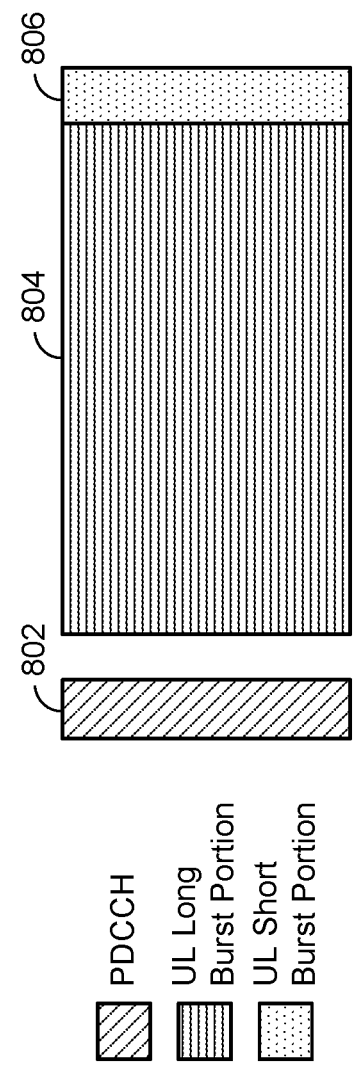

UPLINK CONTROL CHANNEL RESOURCE ALLOCATION

CROSS-REFERENCE TO RELATED APPLICATIONS

This application is a divisional of U.S. patent application Ser. No. 16/244,857, filed on Jan. 10, 2019, entitled "UPLINK CONTROL CHANNEL RESOURCE ALLOCATION" (now U.S. Pat. No. 11,172,430), which claims priority to U.S. Provisional Patent Application No. 62/616,932, filed on Jan. 12, 2018, entitled "TECHNIQUES AND APPARATUSES FOR BANDWIDTH PART SWITCH MANAGEMENT," and U.S. Provisional Patent Application No. 62/617,565, filed on Jan. 15, 2018, entitled "TECHNIQUES AND APPARATUSES FOR BANDWIDTH PART SWITCH MANAGEMENT," which are hereby expressly incorporated by reference herein.

FIELD OF THE DISCLOSURE

Aspects of the present disclosure generally relate to wireless communication, and more particularly to techniques and apparatuses for uplink control channel resource allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining a resource allocation, from a resource set, for a response message using a resource allocation selection procedure based at least in part on at least one of a downlink assignment characteristic, a downlink assignment index (DAI) value, a resource set characteristic for the resource set, a quantity of acknowledgement bits in an acknowledgement message, or a response message resource indicator value. The resource allocation selection procedure may be an implicit resource mapping procedure combined with explicit signaling. The method may include transmitting the response message using the resource allocation and based at least in part on determining the resource allocation.

In some aspects, a user equipment for wireless communication may include memory and one or more processors coupled to the memory. The memory and the one or more processors may be configured to determine a resource allocation, from a resource set, for a response message using a resource allocation selection procedure based at least in part on at least one of a downlink assignment characteristic, a DAI value, a resource set characteristic for the resource set, a quantity of acknowledgement bits in an acknowledgement message, or a response message resource indicator value. The resource allocation selection procedure may be an implicit resource mapping procedure combined with explicit signaling. The memory and the one or more processors may be configured to transmit the response message using the resource allocation and based at least in part on determining the resource allocation.

In some aspects, a non-transitory computer-readable medium may store one or more instructions for wireless communication. The one or more instructions, when executed by one or more processors of a user equipment, may cause the one or more processors to determine a resource allocation, from a resource set, for a response message using a resource allocation selection procedure based at least in part on at least one of a downlink assignment characteristic, a DAI value, a resource set characteristic for the resource set, a quantity of acknowledgement bits in an acknowledgement message, or a response message resource indicator value. The resource allocation selection procedure may be an implicit resource mapping procedure combined with explicit signaling. The one or more instructions, when executed by the one or more processors of the user equipment, may cause the one or more processors to transmit the response message using the resource allocation and based at least in part on determining the resource allocation.

In some aspects, an apparatus for wireless communication may include means for determining a resource allocation, from a resource set, for a response message using a resource allocation selection procedure based at least in part on at least one of a downlink assignment characteristic, a DAI value, a resource set characteristic for the resource set, a quantity of acknowledgement bits in an acknowledgement message, or a response message resource indicator value. The resource allocation selection procedure may be an implicit resource mapping procedure combined with explicit signaling. The apparatus may include means for transmitting the response message using the resource allocation and based at least in part on determining the resource allocation.

In some aspects, a method of wireless communication may include determining, using an implicit resource mapping procedure and before a radio resource control connection establishment, a resource allocation for a redundancy scheme response message based at least in part on a remaining minimum system information (RMSI) value. The method may include transmitting the redundancy scheme response message using the resource allocation based at least in part on determining the resource allocation.

In some aspects, a user equipment for wireless communication may include memory and one or more processors coupled to the memory. The memory and the one or more processors may be configured to determine, using an implicit resource mapping procedure and before a radio resource control connection establishment, a resource allocation for a redundancy scheme response message based at least in part on an RMSI value. The memory and the one or more processors may be configured to transmit the redundancy scheme response message using the resource allocation based at least in part on determining the resource allocation.

In some aspects, a non-transitory computer-readable medium may store one or more instructions for wireless communication. The one or more instructions, when executed by one or more processors of a user equipment, may cause the one or more processors to determine, using an implicit resource mapping procedure and before a radio resource control connection establishment, a resource allocation for a redundancy scheme response message based at least in part on a RMSI value. The one or more instructions, when executed by the one or more processors of the user equipment, may cause the one or more processors to transmit the redundancy scheme response message using the resource allocation based at least in part on determining the resource allocation.

In some aspects, an apparatus for wireless communication may include means for determining, using an implicit resource mapping procedure and before a radio resource control connection establishment, a resource allocation for a redundancy scheme response message based at least in part on a RMSI value. The apparatus may include means for transmitting the redundancy scheme response message using the resource allocation based at least in part on determining the resource allocation.

Aspects generally include a method, apparatus, device, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
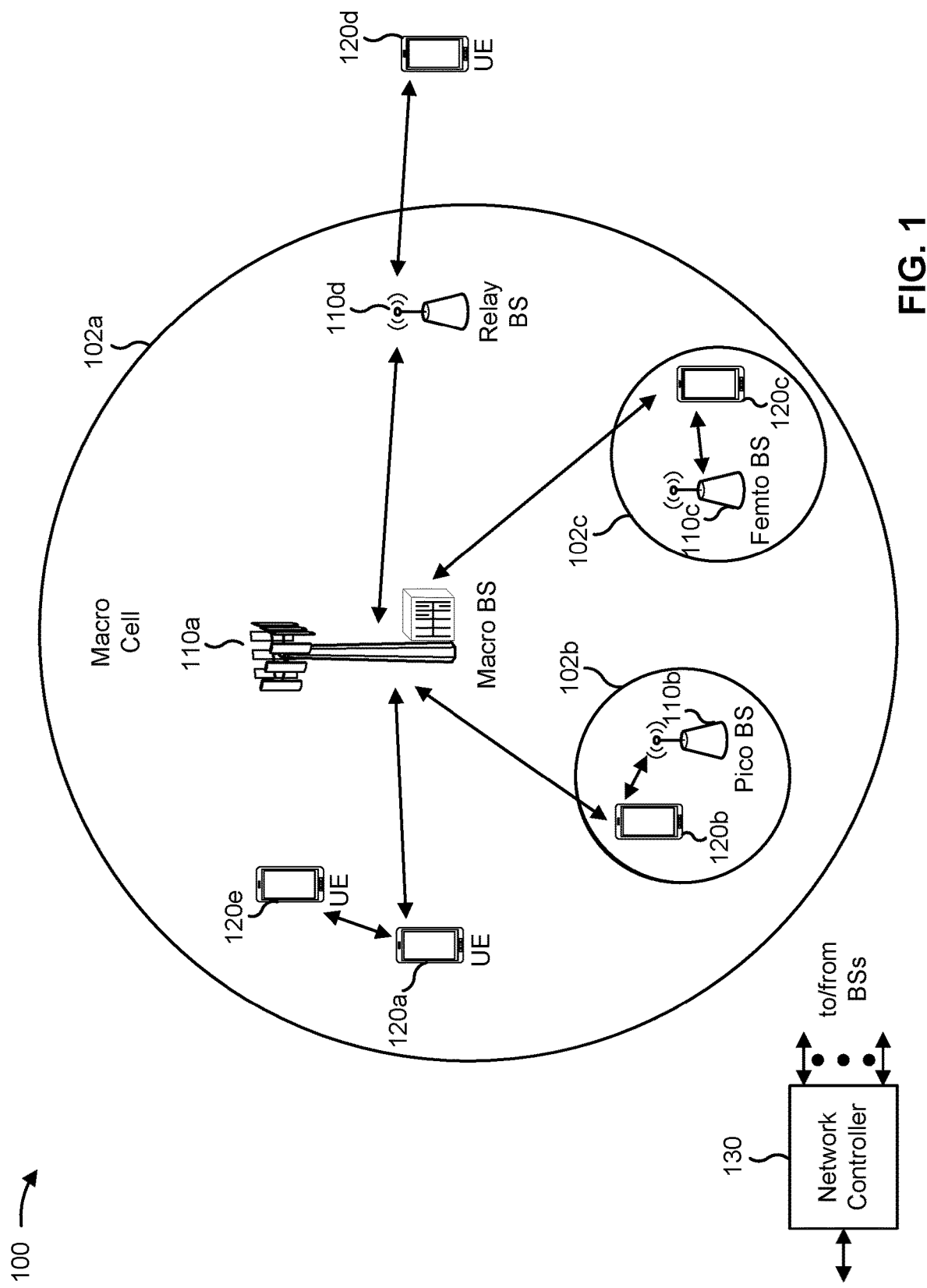
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
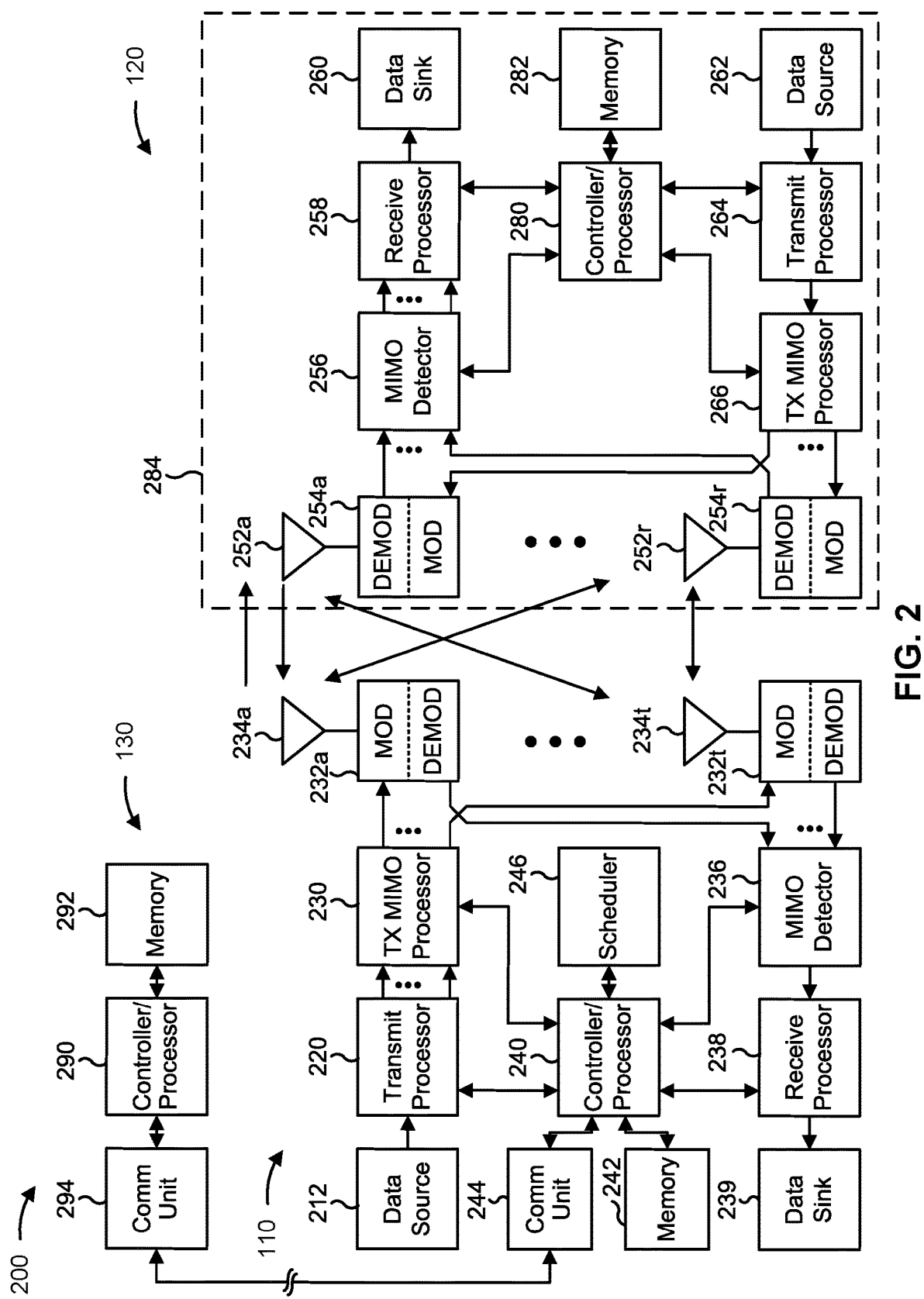
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with uplink control channel resource allocation determination, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a resource allocation, from a resource set, for a response message using a resource allocation selection procedure based at least in part on at least one of a downlink assignment characteristic (e.g., the number of DCI messages, whether there is cross-carrier or cross-slot scheduling, whether the DCI is received on PCC or SCC, how many ACK/NACK bits are needed for the response message, whether ARI has changed, etc.), a downlink assignment index (DAI) value, a resource set characteristic for the resource set, a quantity of acknowledgement bits in an acknowledgement message, or a response message resource indicator value; means for transmitting the response message using the resource allocation and based at least in part on determining the resource allocation; and/or the like. In some aspects, such means may include one or more components of UE 120 described in connection with FIG. 2.

In some aspects, UE 120 may include means for determining, using an implicit resource mapping procedure and before a radio resource control connection establishment, a resource allocation for a redundancy scheme response message based at least in part on a remaining minimum system information (RMSI) value; means for transmitting the redundancy scheme response message using the resource allocation based at least in part on determining the resource allocation; and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
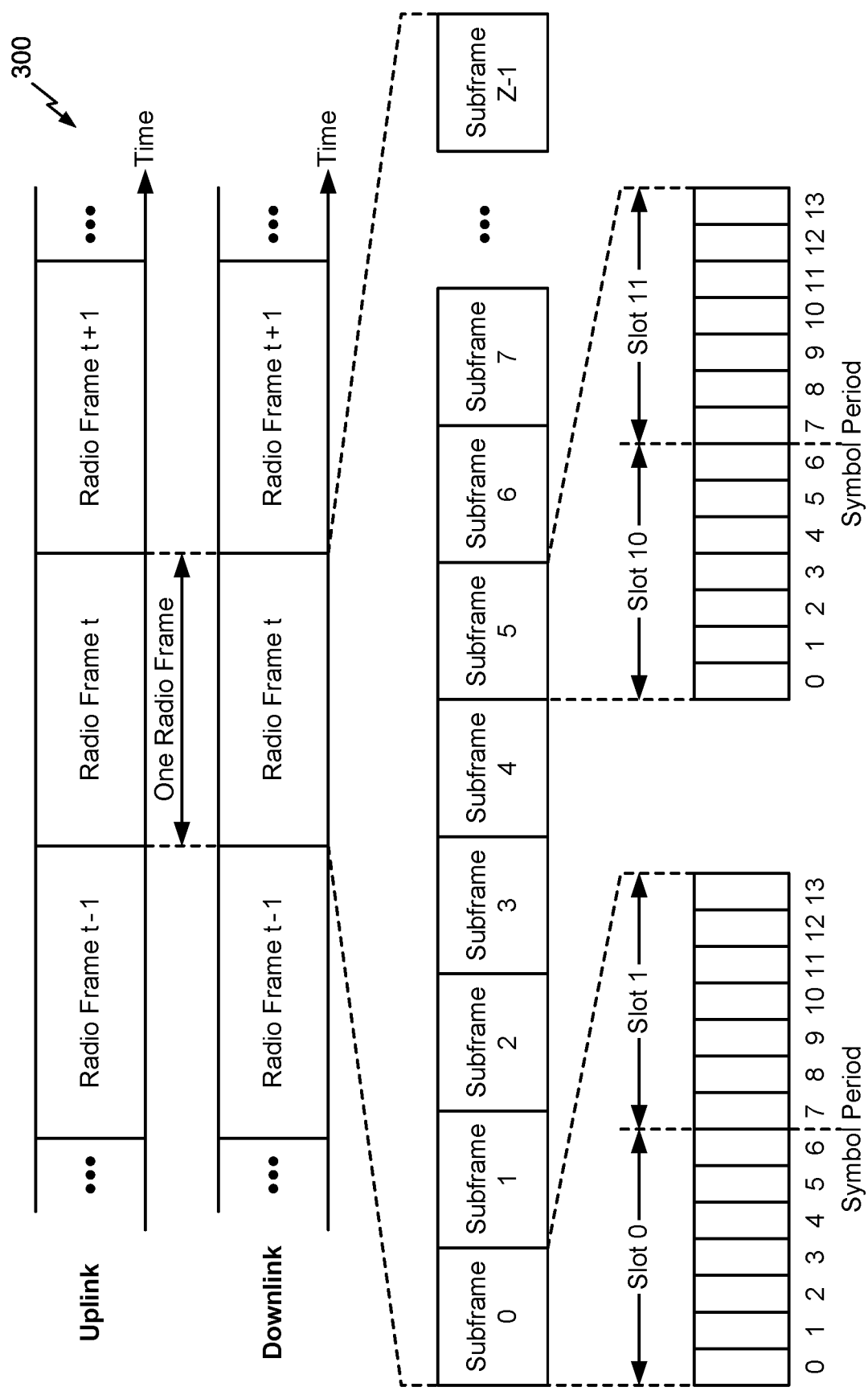
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
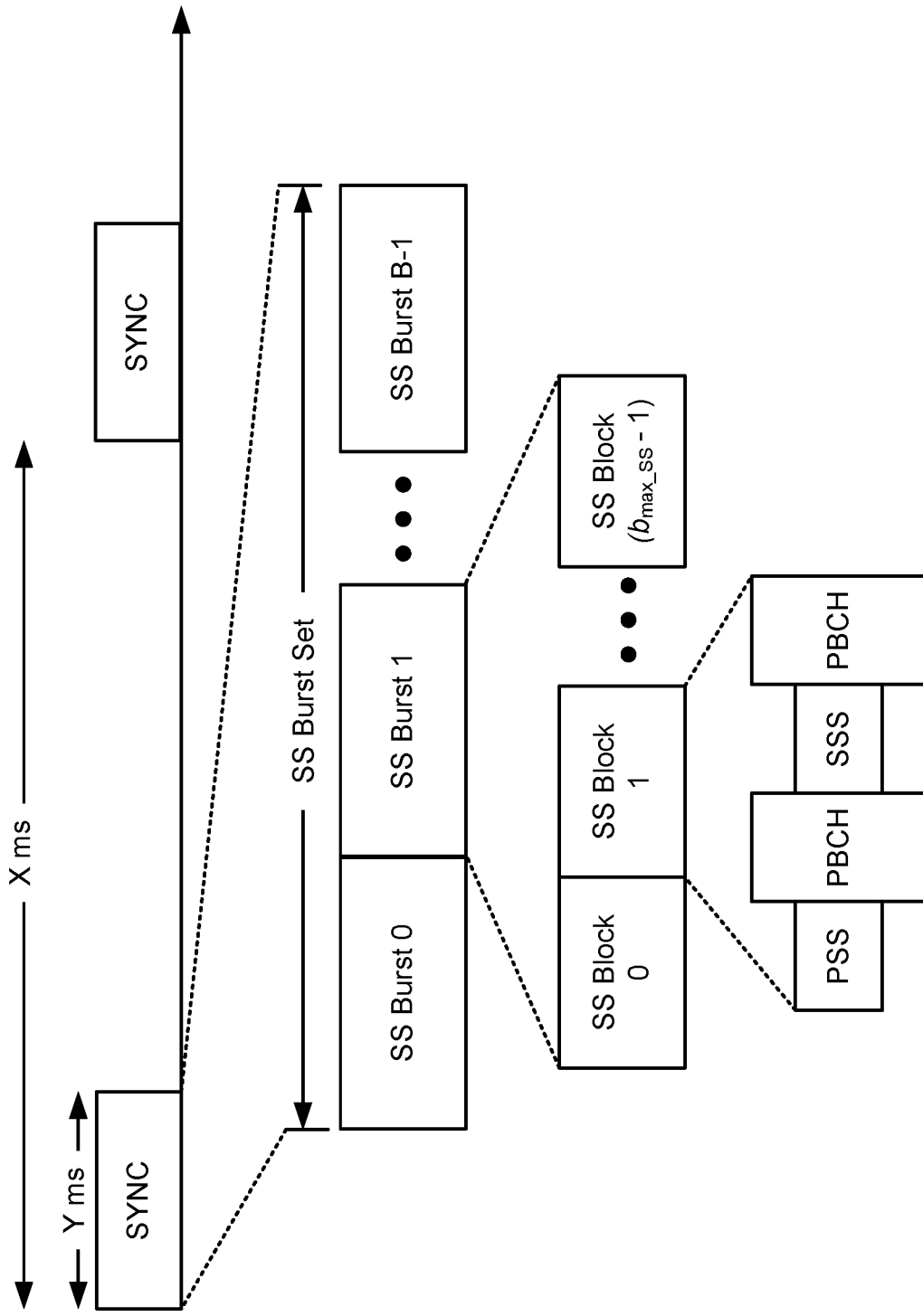
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe.

The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
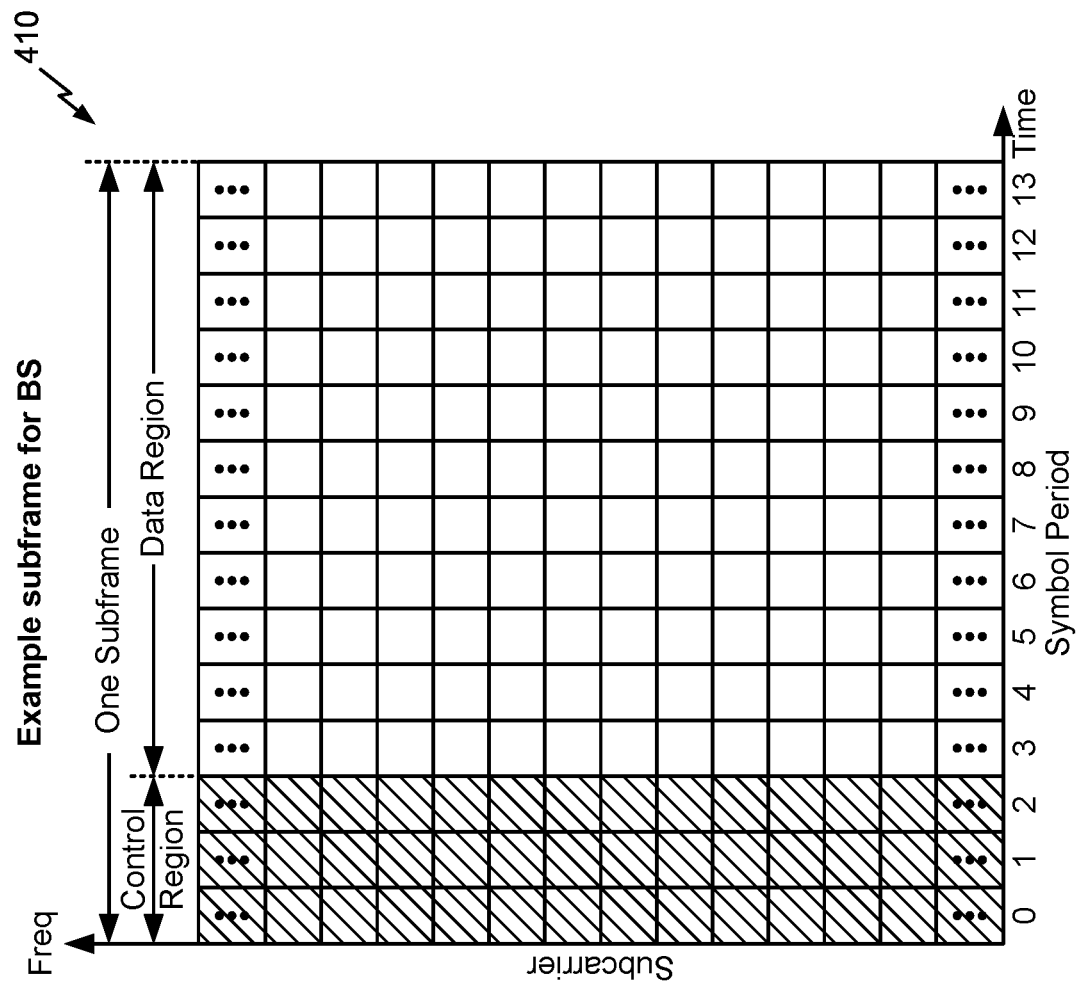
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
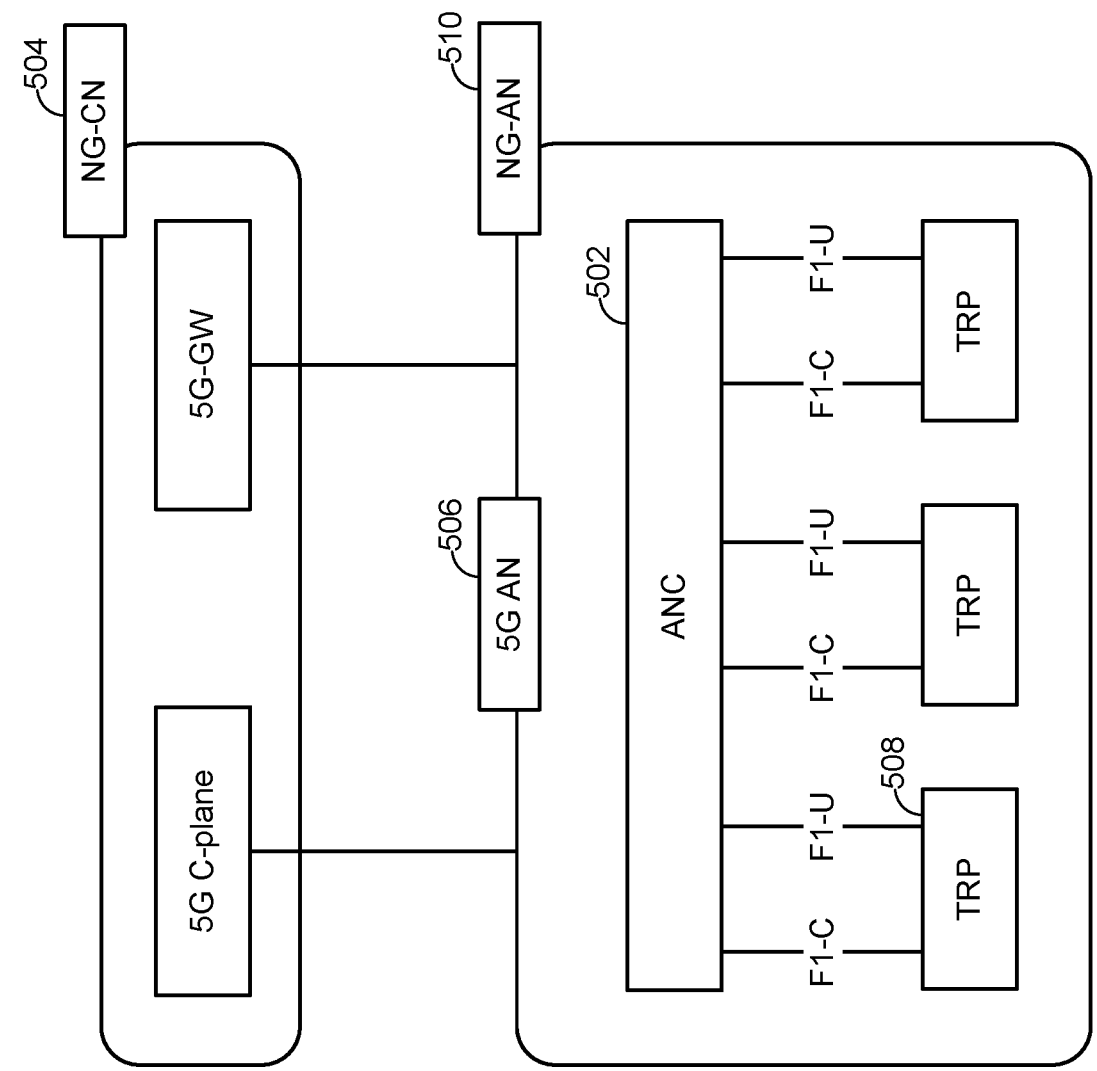
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
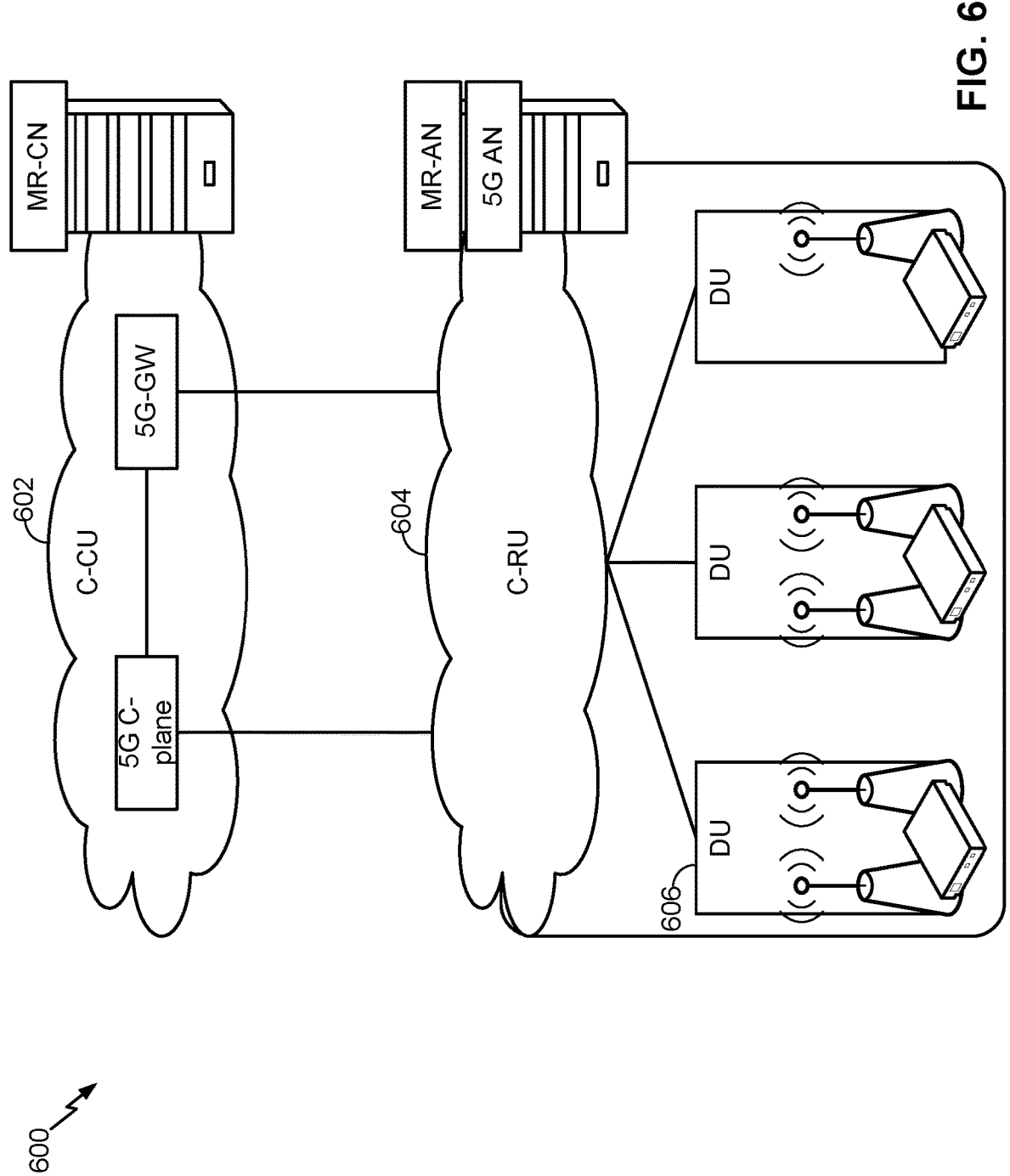
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. In some aspects, the control portion 702 may include legacy PDCCH information, shortened PDCCH (sPDCCH) information, a control format indicator (CFI) value (e.g., carried on a physical control format indicator channel (PCFICH)), one or more grants (e.g., downlink grants, uplink grants, and/or the like), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples may differ from what is described with regard to FIG. 7.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples may differ from what is described with regard to FIG. 8.

ABS may allocate resources to a UE to enable the UE to transmit information to the BS. For example, the BS may transmit an indication, using a downlink channel, of a resource allocation of an uplink channel that the UE is to utilize for communication. The UE may receive the indication of the resource allocation, and may determine the resource allocation for transmitting a response message. For example, the UE may use the resource allocation for transmitting an acknowledgement message, a negative acknowledgement message, and/or the like. The UE may use a resource allocation selection procedure to map an indication of a resource allocation to the resource allocation.

In some cases, the UE may use an explicit or fixed mapping procedure where the resource allocation is statically determined from a resource set. However, the fixed resource mapping procedure may result in the BS being unable to select which resources the UE uses of a group of available resources in a resource set. Alternatively, the UE may use an implicit resource mapping procedure. However, use of the implicit resource mapping procedure may result in the UE failing to accurately map an indication of a resource allocation to the resource allocation in some cases. For example, during a cross-slot scheduling scenario with a plurality of downlink channels, during a carrier aggregation scenario, during an initial access scenario, and/or the like, the UE may fail to identify a correct resource (e.g., a same resource that a BS has allocated for the UE) in a resource set of a resource pool using an implicit resource mapping procedure.

Some aspects described herein may enable dynamic determination of whether to use an implicit resource mapping procedure to identify a resource allocation, and may enable identification and utilization of the resource allocation. For example, a UE may determine whether to use an implicit resource mapping procedure and/or may select from a plurality of implicit resource mapping procedures for use during a cross-slot scheduling scenario, a carrier aggregation scenario, an initial access scenario, and/or the like. In this way, the UE improves a likelihood of correctly identifying a resource allocation for an uplink control channel and for use in transmitting a response message, thereby improving network performance.

Figure 9:
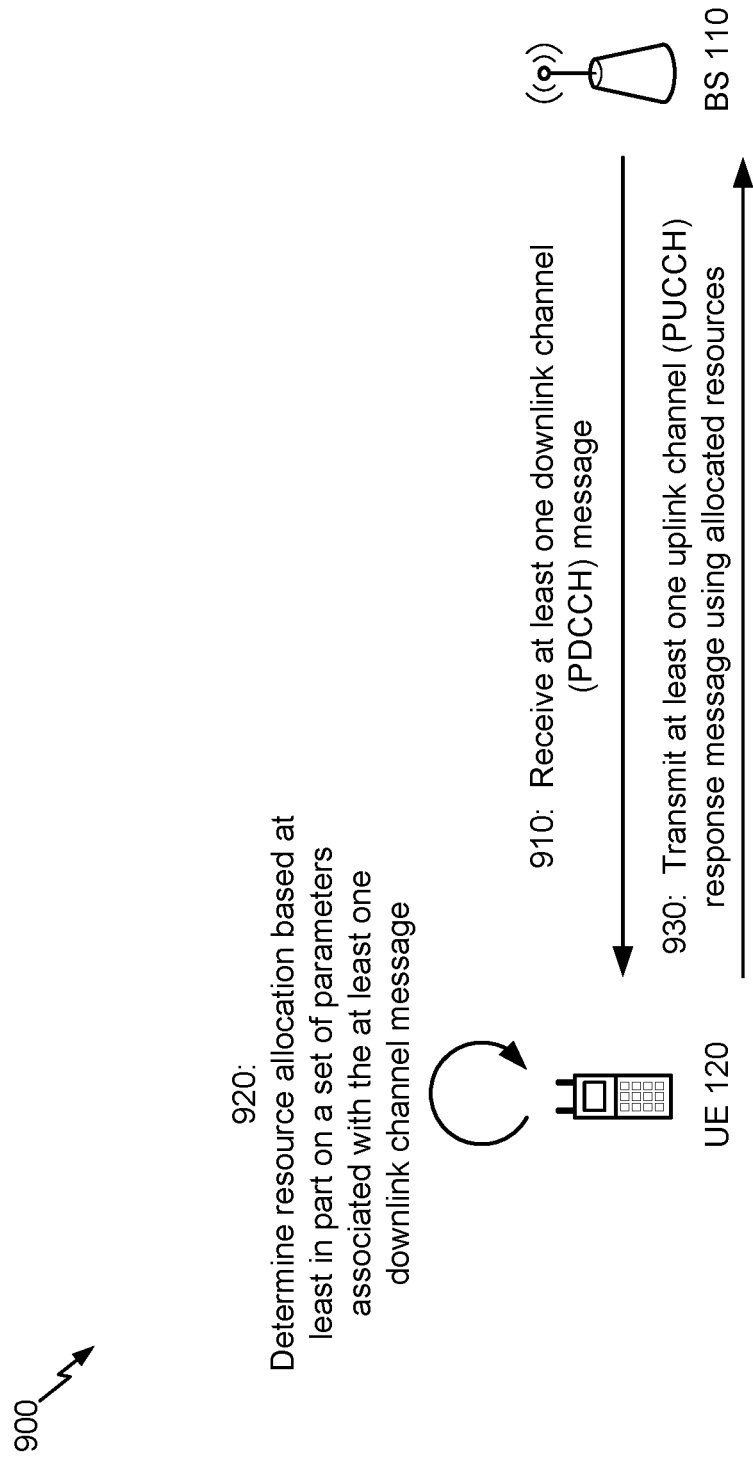
FIG. 9 is a diagram illustrating an example of uplink control channel resource allocation determination, in accordance with various aspects of the present disclosure.

FIG. 9 is a diagram illustrating an example 900 of uplink control channel resource allocation determination, in accordance with various aspects of the present disclosure. As shown in FIG. 9, example 900 includes a BS 110 and a UE 120.

As further shown in FIG. 9, and by reference number 910, UE 120 may receive at least one downlink channel message. For example, UE 120 may receive a message associated with a PDCCH. In some aspects, UE 120 may receive a message associated with a PDSCH. In some aspects, UE 120 may receive a message for acknowledgement. For example, UE 120 may receive a downlink control information (DCI) message, and may determine to acknowledge the DCI message using a resource allocation of a PUCCH. In some aspects, UE 120 may receive a radio resource control (RRC) message. For example, UE 120 may receive an RRC message associated with providing one or more parameters for UE 120 to use to determine the resource allocation. In some aspects, UE 120 may receive a plurality of PDCCHs. For example, in a cross slot scheduling scenario, UE 120 may receive a plurality of PDCCHs associated with a plurality of slots.

Additionally, or alternatively, in a carrier aggregation scenario, UE 120 may receive a plurality of PDCCHs associated with a plurality of component carriers (e.g., each of which may be associated with a different control channel element), a primary component carrier and a secondary component carrier, and/or the like. In some aspects, UE 120 may receive at least one message associated with at least one PDCCH in a cross slot scheduling and carrier aggregation scenario.

In some aspects, UE 120 may determine to use the implicit resource mapping procedure based at least in part on a quantity of acknowledgement bits provided in an acknowledgement message. For example, UE 120 may determine to use the implicit resource mapping procedure when the number of acknowledgement bits provided in an acknowledgement message is one or two. In some aspects, UE 120 may determine to use the implicit resource mapping procedure for a plurality of PDCCHs. For example, UE 120 may determine to use the implicit resource mapping procedure when one or two PDCCHs are provided by BS 110. In some aspects, UE 120 may use the implicit resource mapping procedure combined with explicit signaling. For example, UE 120 may receive some explicit signaling (e.g., identifying a portion of mapping, including acknowledgement bits to indicate use of implicit resource mapping, and/or the like), and may perform implicit resource mapping in connection with the explicit signaling.

In some aspects, UE 120 may receive at least one message in an initial access scenario. For example, UE 120 may receive a message before an RRC connection setup, and may transmit a redundancy scheme response message to indicate successful receipt of the message. In this case, the redundancy scheme response message may be a hybrid automatic repeat request (HARD) acknowledgement (HARQ-ACK) or negative acknowledgement (HARQ-NACK) message. In some aspects, UE 120 may receive a message identifying a remaining system information (RMSI) value (e.g., a 4-bit parameter) associated with the HARQ-ACK message, and may determine a resource allocation for the HARQ-ACK based at least in part on the RMSI value.

As further shown in FIG. 9, and by reference number 920, UE 120 may determine a resource allocation based at least in part on a set of parameters associated with the at least one downlink channel message. In some aspects, UE 120 may determine a resource allocation selection scheme to utilize to determine the resource allocation based at least in part on the set of parameters.

In some aspects, the UE may determine the resource index based at least in part on implicit mapping from the starting resource block (RB) of the downlink data channel. For example, when the quantity of resources in the resource set is 2, an even RB of the downlink data channel may indicate to use the first resource, an odd RB of the downlink data channel may indicate to use the second resource, and/or the like. In this case, UE 120 may determine the resource allocation based at least in part on an equation $r=\mod(N, M)$, where r is the determined resource index, N is the starting RB index of the PDSCH, and M is a quantity of PUCCH resources in a subset of PUCCH resources (e.g., of a resource pool) identified based at least in part on the ARI bits.

In some aspects, the UE may determine the resource allocation using the implicit resource mapping procedure based at least in part on a starting resource block (RB) index or a starting RB group (RBG) index of the downlink data channel. For example, when the quantity of resources in the resource set is 2, an even RB index or RBG index of the downlink data channel may indicate use of a first resource, an odd RB index or RBG index of the downlink data channel may indicate use of the second resource, and/or the like. In this case, UE 120 may determine the resource allocation based at least in part on an equation r=mod(N, M), where r is the determined resource index, N is the starting RB index of a downlink data channel, and M is a quantity of PUCCH resources in a subset of PUCCH resources (e.g., of a resource pool) identified based at least in part on the ARI bits. In some aspects, the resource pool may change when a quantity of ACK bits or NACK bits satisfies a threshold corresponding to a format of the PUCCH.

In some aspects, UE 120 may determine the resource allocation based at least in part on an equation r=mod(N/G, M), where G is the quantity of RBs in an RBG, and N/G represents a starting RBG index of the downlink data channel. In some aspects, a starting RB index and a corresponding starting RBG index may be defined in a UE specific UL bandwidth part (BWP). For example, the starting RB index or the starting RBG index may be UE-specific values and may not be unique for the same physical RBs (PRB). In some aspects, the starting RB index and the corresponding starting RBG index may be defined for a system bandwidth. For example, the starting RB index or the starting RBG index may be cell-specific and unique for the same PRB.

In some aspects, such as in a cross-slot scheduling scenario, a carrier aggregation scenario, and/or the like, the BS may assign the multiple downlink data channels across slots and across component carriers (CCs) with starting RB indices or starting RBG indices that will be mapped to the same resource index in the resource set. For example, when M=2 there is only two resources in the resource set. The BS may use an even starting RB index or starting RBG index to transmit a plurality of downlink data channels when the response messages for the downlink data channels are transmitted at the same UL resource. In this case, the UE will use the first UL resource, such as when some of the plurality of downlink control channels are not decoded successfully. Additionally, or alternatively, the BS may use an odd starting RB index or RBG index to transmit the plurality of downlink data channels, such as when response messages for the plurality of downlink data channels are transmitted using the same UL resource. In this case, the UE may use another UL resource, such as when some of the plurality of downlink control channels are not decoded successfully.

In some aspects, a UE may determine the resource index by implicit mapping based at least in part on one of the downlink control channel characteristic. For example, in a cross slot scheduling scenario, UE 120 may determine a downlink channel characteristic (e.g., a downlink control channel characteristic, a downlink data channel characteristic, and/or the like), such as that a single PDCCH is detected, and may determine to use an implicit resource mapping procedure based at least in part on the single PDCCH being detected.

Additionally, or alternatively, UE 120 may determine to use the implicit resource mapping procedure based at least in part on determining that a value for a downlink assignment index (DAI) is zero and a quantity of decoded PDCCHs corresponding to a PUCCH is one. In this case, UE 120 may determine that BS 110 provided a single PDCCH, and may use the implicit resource mapping procedure to select a resource allocation. In some aspects, such as in a carrier aggregation scenario, UE 120 may determine to use the implicit resource mapping procedure when a single PDDCH is detected on a primary component carrier. Additionally, or alternatively, UE 120 may determine to use the implicit resource mapping procedure when a DAI value has increased by one relative to a previous DAI value. In this case, UE 120 may determine, based at least in part on the DAI values, that a single component carrier is used, and may use the implicit resource mapping procedure.

Additionally, or alternatively, UE 120 may determine to use the implicit resource mapping procedure based at least in part on a resource set characteristic. For example, based at least in part on a last received PDCCH being associated with a different resource pool from one or more other PDCCHs, UE 120 may determine to use the implicit resource mapping procedure. Additionally, or alternatively, UE 120 may determine to use the implicit resource mapping procedure based at least in part on a response message resource indicator value. For example, based at least in part on determining that an acknowledgement/negative-acknowledgement (A/N) resource indicator (ARI) value has changed relative to a previous ARI value associated with a previous PDCCH, UE 120 may determine to use the implicit resource mapping procedure.

In some aspects, UE 120 may determine to use a fixed resource mapping procedure. For example, based at least in part on detecting a plurality of PDCCHs, UE 120 may use the fixed resource mapping procedure. Additionally, or alternatively, UE 120 may determine to use the fixed resource mapping procedure based at least in part on a DAI value not being zero or a quantity of decoded PDCCHs corresponding to a PUCCH being greater than one. Additionally, or alternatively, UE 120 may determine to use the fixed resource mapping procedure based at least in part on a resource pool associated with a last received PDCCH not changing and an ARI value not changing.

In some aspects, UE 120 may determine the resource allocation using a fixed resource allocation procedure. For example, UE 120 may determine to use a first identified resource of a set of resources of a resource pool. In some aspects, UE 120 may determine the resource allocation using a selected implicit resource mapping procedure of a plurality of implicit resource mapping procedures. For example, UE 120 may determine to use a control channel element (CCE) based implicit resource mapping procedure for determining a resource allocation. In some case, UE 120 may determine the resource allocation based at least in part on an equation r=mod(C/L, M), where r is the determined resource allocation, C is a starting CCE index, L is an aggregation level of a last received PDCCH that includes ARI bits, and M is a quantity of PUCCH resources in a subset of PUCCH resources (e.g., of a resource pool) identified based at least in part on the ARI bits. In some case, UE 120 may determine the resource allocation based at least in part on an equation r=mod(C, M). In some case, UE 120 may determine the resource allocation based at least in part on one of the equations r=mod(C/L, M) or r=mod(C, M) according to the value of M. For example, when M is not power of 2, the UE will use r=mod(C, M). When M is power of 2, the UE will use r=mod(C/L, M). In another example, the UE may determine to use r=mod(C, M) when M is power of 2 but L<M and to use r=mod(C*M/L/2, M) when M is power of 2 and L is greater than or equal to M.

Additionally, or alternatively, UE 120 may select a DAI based implicit resource mapping procedure. For example, UE 120 may determine the resource allocation based at least in part on an equation r=mod(D, M), where D is a total DAI value for a last received PDCCH. In this way, BS 110 may pseudo-randomize resource allocation based at least in part on differing values for the DAI for different PDCCHs. Additionally, or alternatively, UE 120 may select a redundancy check based implicit resource mapping procedure. For example, UE 120 may determine the resource allocation based at least in part on a cyclic redundancy check (CRC) mask value. In this way, BS 110 may control the resource allocation by controlling the value for the CRC mask, and may maintain a common CRC mask across multiple PDCCHs to ensure consistent resource allocation selection.

In some aspects, UE 120 may determine to select the CCE based implicit resource mapping procedure. For example, UE 120 may select the CCE based implicit resource mapping procedure when a DAI value is 0. Additionally, or alternatively, UE 120 may select the CCE based implicit resource mapping procedure when a single component carrier is used (e.g., determined based at least in part on a DAI value change relative to a previous DAI value), when a resource pool changes, when ARI bits change for an unchanged resource pool, and/or the like. Alternatively, UE 120 may select the DAI based implicit resource mapping procedure or the CRC based implicit resource mapping procedure when one or more of these conditions are satisfied.

In some aspects, UE 120 may determine the resource allocation for an initial access acknowledgement message. For example, when UE 120 is to transmit a HARQ-ACK before an RRC connection setup, UE 120 may determine the resource allocation using the implicit resource mapping procedure. In this case, UE 120 may identify a PUCCH resource from a set of resources based at least in part on an RMSI value. In some aspects, UE 120 may determine the set of resources using a resource allocation index. For example, UE 120 may store a table or another type of data structure, and may select a table value based at least in part on the RMSI value. In this case, the table value may correspond to a resource set of a resource pool. In some aspects, UE 120 may select the set of resources based at least in part on a resource block offset value. For example, UE 120 may store a table or another type of data structure identifying each candidate resource set of a plurality of resource sets, and may use the resource block index value and a resource block offset value corresponding to the RMSI value to select a particular resource set from the candidate resource sets. In some aspects, UE 120 may determine the resource allocation for an initial access acknowledgement message by implicit mapping from the starting CCE index of the downlink control for message 4. In some case the number of resources, M, in the resource set is greater than the maximum aggregation level L_max. In this, the UE may determine the resource allocation using the equation r=mod(C, M).

As further shown in FIG. 9, and by reference number 930, UE 120 may transmit at least one uplink channel response message using allocated resources based at least in part on determining the resource allocation. For example, UE 120 may transmit an acknowledgement message, a negative acknowledgement message, a HARQ-ACK, a HARQ-NACK, and/or the like using a resource allocation of a PUCCH and/or the like.

As indicated above, FIG. 9 is provided as an example. Other examples are possible and may differ from what was described with respect to FIG. 9.

Figure 10:
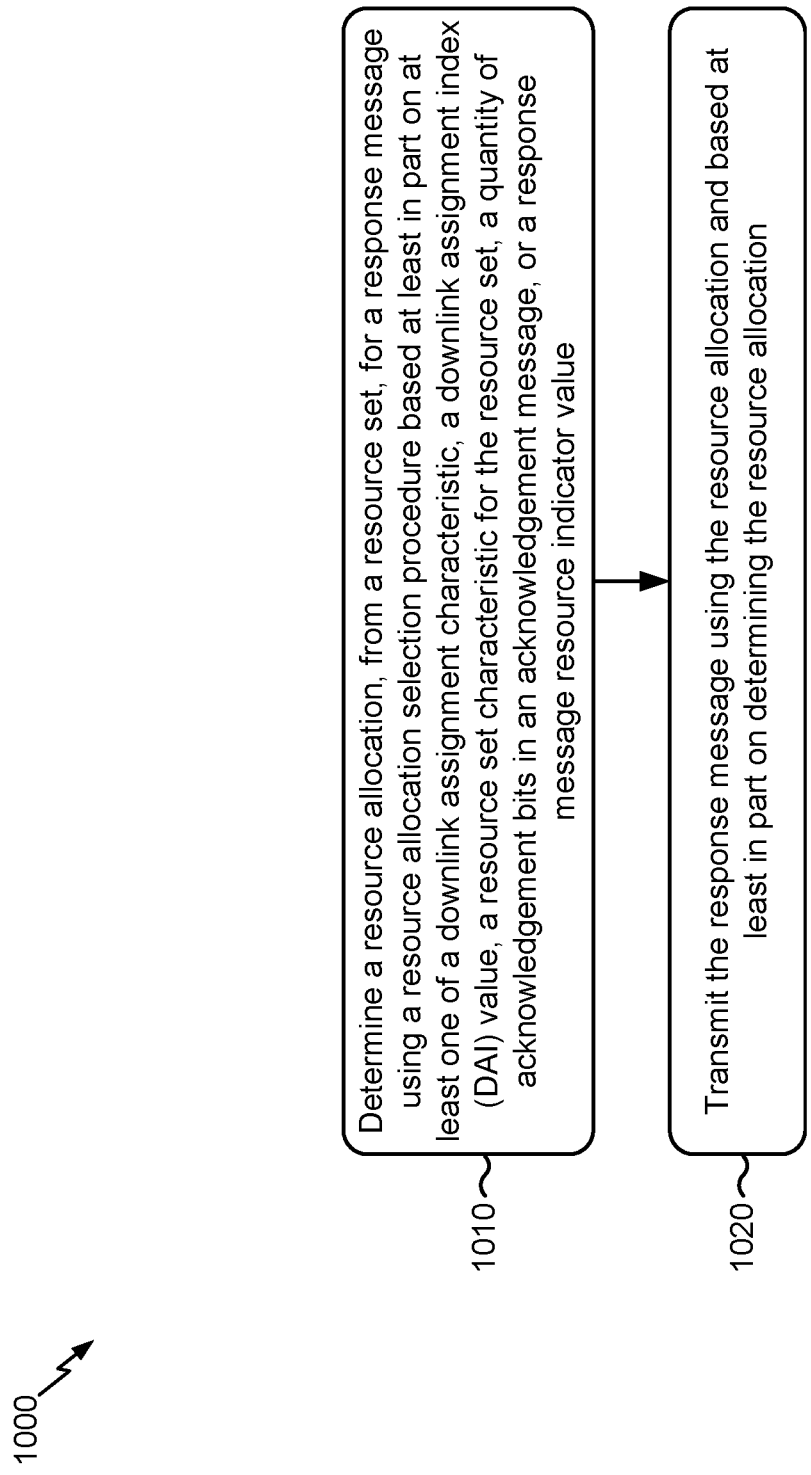
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where a UE (e.g., UE 120) performs uplink control channel resource allocation determination.

As shown in FIG. 10, in some aspects, process 1000 may include determining a resource allocation, from a resource set, for a response message using a resource allocation selection procedure based at least in part on at least one of a downlink assignment characteristic, a downlink assignment index (DAI) value, a resource set characteristic for the resource set, a quantity of acknowledgement bits in an acknowledgement message, or a response message resource indicator value (block 1010). For example, the UE may determine (e.g., using receive processor 258, transmit processor 264, controller/processor 280, and/or the like) the resource allocation for the response message based at least in part on a downlink control channel characteristic, a downlink data channel characteristic, the DAI value, the resource set characteristic, the response message resource indicator value, and/or the like, as described in more detail above. In some aspects, the resource allocation selection procedure comprises an implicit resource mapping procedure combined with explicit signaling. For example, implicit mapping may be performed based at least in part on a control channel element (CCE) index, and explicit signaling may be provided (e.g., via a physical uplink control channel (PUCCH) indicator). In some aspects, the UE may determine the resource allocation for the response message based at least in part on the downlink data channel characteristic (e.g., the starting RB of the PDSCH channel).

As shown in FIG. 10, in some aspects, process 1000 may include transmitting the response message using the resource allocation and based at least in part on determining the resource allocation (block 1020). For example, the UE may transmit (e.g., using transmit processor 264, TX MIMO processor 266, modulator 254, antenna 252, and/or the like) the response message using the resource allocation, as described in more detail above.

Process 1000 may include additional aspects, such as any single aspect and/or any combination of aspects described below and/or in connection with one or more other processes described elsewhere herein.

In some aspects, the implicit resource mapping procedure is used to determine the resource allocation and the implicit resource mapping procedure is selected based at least in part on the at least one of the downlink control channel characteristic, the DAI value, the resource set characteristic for the resource set, a quantity of acknowledgement bits in an acknowledgement message, or the response message resource indicator value. In some aspects, the resource set is a subset of a resource pool and is identified based at least in part on the response message resource indicator value. In some aspects, the resource allocation is determined, using the implicit resource mapping procedure, based at least in part on at least one of a quantity of resources in the resource set, a control channel element index associated with a downlink control channel, or an aggregation level associated with the downlink control channel.

In some aspects, the fixed resource mapping procedure is used to determine the resource allocation based at least in part on the at least one of the downlink control channel characteristic, the DAI value, the resource set characteristic for the resource set, a quantity of acknowledgement bits in an acknowledgement message, or the response message resource indicator value. In some aspects, the resource allocation is determined, using the fixed resource mapping procedure, on a preconfigured resource selection rule. In some aspects, the implicit resource mapping procedure is selected based at least in part on at least one of the downlink assignment characteristic, the DAI value indicating a single downlink channel, or on a downlink data channel characteristic.

In some aspects, the implicit resource mapping procedure is selected based at least in part on the resource set characteristic indicating an alteration to the resource set. In some aspects, the implicit resource mapping procedure is selected based at least in part on an alteration to the response message resource indicator value and the resource set characteristic indicating no alteration to the resource set. In some aspects, the fixed resource mapping procedure is selected based at least in part on at least one of at least one of the downlink control channel characteristic or the DAI value indicating a plurality of downlink control channels, or the resource set characteristic indicating no alteration to the resource set and determining no alteration to the response message resource indicator value.

In some aspects, the implicit resource mapping procedure is selected based at least in part on at least one of the downlink control channel characteristic or the DAI value indicating a single downlink control channel for a primary component carrier. In some aspects, the implicit resource mapping procedure is selected based at least in part on the DAI value and a previous DAI value indicating a single component carrier. In some aspects, the resource allocation is determined, using the implicit resource mapping procedure, based at least in part on at least one of the DAI value or a redundancy check mask value.

In some aspects, the UE may determine the resource allocation for the response message based at least in part on the downlink data channel characteristic (e.g., the starting RB of the PDSCH channel).

In some aspects, the implicit resource mapping procedure is selected from a plurality of implicit resource mapping procedures. In some aspects, the resource allocation is determined, using the implicit resource mapping procedure, based at least in part on a control channel element index and based at least in part on determining at least one of a single downlink control channel, a single component carrier, a change to the resource set, a quantity of acknowledgement bits in an acknowledgement message, or a change to the response message resource indicator value. In some aspects, the resource allocation is determined, using the implicit resource mapping procedure, based at least in part on the DAI value and based at least in part on determining at least one of a plurality of downlink control channels, a plurality of component carriers, no change to the resource set and no change to the response message resource indicator value, and/or the like.

In some aspects, the response message is an acknowledgement message or a negative-acknowledgement message. In some aspects, the resource allocation is a physical uplink control channel resource allocation. In some aspects, a downlink channel relating to the downlink assignment characteristic is a physical downlink channel. In some aspects, a downlink data channel relating to the downlink assignment characteristic is a physical downlink data channel (e.g., a PDSCH). In some aspects, the response message resource indicator value is an acknowledgement negative-acknowledgement (A/N) resource indicator (ARI) value.

In some aspects, the UE is operating in a carrier aggregation scenario, the downlink assignment characteristic indicates that a single grant is associated with a primary component carrier, and the resource allocation selection procedure is the implicit resource mapping procedure. In some aspects, the UE is configured for carrier aggregation operation, and the downlink assignment characteristic indicates a plurality of decoded grants, and the resource allocation selection procedure is the fixed resource mapping procedure. In some aspects, the UE is operating in a carrier aggregation scenario, the downlink assignment characteristic indicates a grant decoded in connection with a secondary component carrier, and the resource allocation selection procedure is the fixed resource mapping procedure.

In some aspects, the UE is configured for carrier aggregation operation and cross slot scheduling, and the downlink assignment characteristic indicates a plurality of downlink channels, each grant, of a plurality of grants, is associated with a common component carrier, and the resource allocation selection procedure is the implicit resource mapping procedure. In some aspects, the UE is configured for carrier aggregation operation and cross slot scheduling, and the downlink assignment characteristic indicates a plurality of downlink channels, the resource set characteristic indicates a change to the resource set, and the resource allocation selection procedure is the implicit resource mapping procedure. In some aspects, the resource allocation is determined, using the implicit resource mapping procedure, based at least in part on at least one of a resource block index or a resource block group index associated with a downlink channel, and the downlink channel is a downlink data channel. In some aspects, the UE is operating in a carrier aggregation and cross slot scheduling scenario, the downlink assignment characteristic indicates a plurality of downlink channels, the response message resource indicator value indicates a change relative to a previous response message resource indicator value, and the resource allocation selection procedure is the implicit resource mapping procedure. In some aspects, the UE is configured to determine to use the implicit resource mapping procedure based at least in part on a quantity of acknowledgement bits in an acknowledgement message. For example, the UE is configured to determine to use the implicit resource mapping procedure when the number of acknowledgement bits is one or two.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
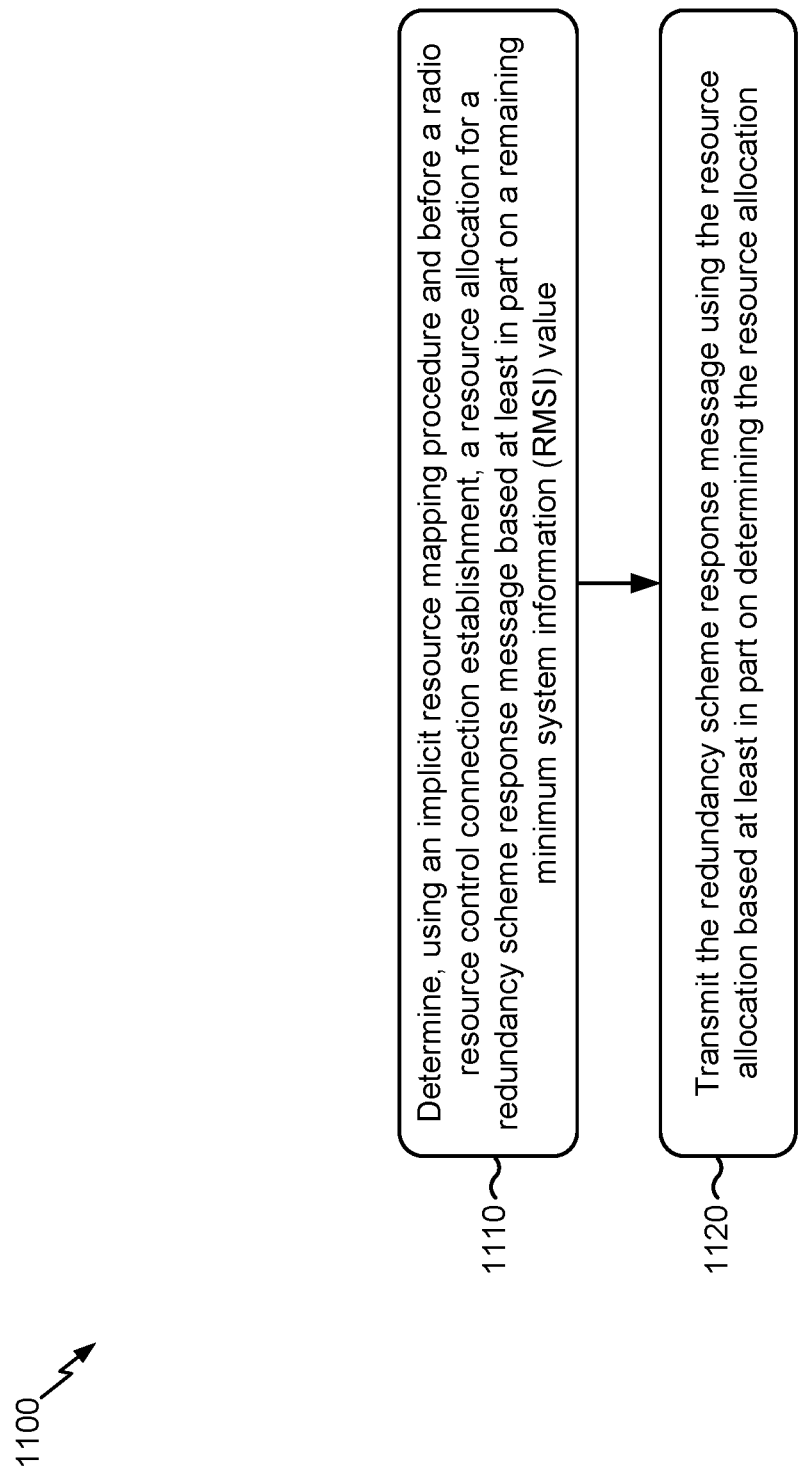
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) performs uplink control channel resource allocation determination.

As shown in FIG. 11, in some aspects, process 1100 may include determining, using an implicit resource mapping procedure and before a radio resource control connection establishment, a resource allocation for a redundancy scheme response message based at least in part on a remaining minimum system information (RMSI) value (block 1110). For example, the UE may determine (e.g., using receive processor 258, transmit processor 264, controller/processor 280, and/or the like) the resource allocation for the redundancy scheme message based at least in part on the RMSI value, as described in more detail above.

As shown in FIG. 11, in some aspects, process 1100 may include transmitting the redundancy scheme response message using the resource allocation based at least in part on determining the resource allocation (block 1120). For example, the UE may transmit (e.g., using transmit processor 264, TX MIMO processor 266, modulator 254, antenna 252, and/or the like) the redundancy scheme response message using the resource allocation, as described in more detail above.

Process 1100 may include additional aspects, such as any single aspect and/or any combination of aspects described below and/or in connection with one or more other processes described elsewhere herein.

In some aspects, a redundancy scheme associated with the redundancy scheme response message is hybrid automatic repeat request (HARQ) and the response message is a HARQ acknowledgement (HARQ-ACK). In some aspects, the resource allocation is determined based at least in part on a resource allocation index, of a plurality of resource allocation indices associated with a corresponding plurality of resource allocations that includes the resource allocation, identified based at least in part on the RMSI value. In some aspects, the resource allocation is determined based at least in part on a resource block offset identified based at least in part on the RMSI value. In some aspects, the resource allocation is determined based at least in part on at least one of resource block offset identified based at least in part on the RMSI value or a resource block group offset identified based at least in part on the RMSI value.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a "processor" is implemented in hardware, firmware, and/or a combination of hardware and software.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors, coupled to the memory, configured to:
determine a physical uplink control channel (PUCCH) resource, for transmitting a hybrid automatic repeat request acknowledgment (HARQ-ACK) message, using a resource selection procedure from a plurality of resource selection procedures to identify a resource allocation of the PUCCH resource,
wherein the plurality of resource selection procedures comprises a first resource selection procedure used before a radio resource control setup is received and a second resource selection procedure,
wherein the resource selection procedure is the first resource selection procedure or the second resource selection procedure,
wherein the first resource selection procedure includes selecting a value, from a table and based on a remaining minimum system information (RMSI) value, that corresponds to a resource set that includes the PUCCH resource, wherein a resource block offset corresponds to the RMSI value, and
wherein the second resource selection procedure comprises using an implicit resource mapping procedure, based at least in part on a control channel element (CCE) index of a physical downlink control channel (PDCCH), and explicit signaling comprising a PUCCH indicator; and
transmit the HARQ-ACK message using the PUCCH resource.

2. The UE of claim 1, wherein the PUCCH resource is determined based on a resource block group offset identified based at least in part on the RMSI value.

3. The UE of claim 1, wherein the one or more processors are further configured to:
receive a message identifying the RMSI value.

4. The UE of claim 1, wherein the RMSI value is a 4-bit parameter.

5. The UE of claim 1, wherein the PUCCH resource is determined based on a quantity of PUCCH resources in a subset of PUCCH resources of a resource pool.

6. The UE of claim 1, wherein the table is stored by the UE.

7. The UE of claim 1, wherein the PUCCH resource is determined based on information of a downlink control for a message.

8. The UE of claim 1, wherein the CCE index is a starting CCE index of downlink control for message 4.

9. The UE of claim 1, wherein the value is an index.

10. The UE of claim 1, wherein the resource set is a resource set of a resource pool.

11. The UE of claim 1, wherein the PUCCH resource is determined based on downlink control information (DCI).

12. The UE of claim 1,
wherein the one or more processors are further configured to:
receive a downlink control information (DCI) message, and
wherein the HARQ-ACK message is for the DCI message.

13. The UE of claim 1, wherein the second resource selection procedure is used before the radio resource control setup is received.

14. The UE of claim 1, wherein the one or more processors are further configured to:
receive the explicit signaling.

15. The UE of claim 1, wherein, to transmit the HARQ-ACK message using the PUCCH resource, the one or more processors are configured to:
transmit, before the radio resource control setup is received, the HARQ-ACK message using the PUCCH resource.

16. The UE of claim 1, wherein the explicit signaling identifies a portion of the resource set.

17. The UE of claim 1, wherein the explicit signaling includes one or more acknowledgement bits.

18. The UE of claim 1, wherein the PUCCH resource is associated with a starting resource block index.

19. The UE of claim 18, wherein the starting resource block index is cell specific.

20. A method of wireless communication performed by a user equipment (UE), comprising:
determining a physical uplink control channel (PUCCH) resource, for transmitting a hybrid automatic repeat request acknowledgment (HARQ-ACK) message, using a resource selection procedure from a plurality of resource selection procedures to identify a resource allocation of the PUCCH resource,
wherein the plurality of resource selection procedures comprises a first resource selection procedure used before a radio resource control setup is received and a second resource selection procedure,
wherein the resource selection procedure is the first resource selection procedure or the second resource selection procedure,
wherein the first resource selection procedure includes selecting a value, from a table and based on a remaining minimum system information (RMSI) value, that corresponds to a resource set that includes the PUCCH resource, wherein a resource block offset corresponds to the RMSI value, and
wherein the second resource selection procedure comprises using an implicit resource mapping procedure, based at least in part on a control channel element (CCE) index of a physical downlink control channel (PDCCH), and explicit signaling comprising a PUCCH indicator; and
transmitting the HARQ-ACK message using the PUCCH resource.

21. The method of claim 20, wherein the PUCCH resource is determined based on a resource block group offset identified based at least in part on the RMSI value.

22. The method of claim 20, further comprising:
receiving a message identifying the RMSI value.

23. The method of claim 20, wherein the RMSI value is a 4-bit parameter.

24. The method of claim 20, wherein the PUCCH resource is determined based on a quantity of PUCCH resources in a subset of PUCCH resources of a resource pool.

25. The method of claim 20, wherein the value is an index.

26. The method of claim 20, wherein the PUCCH resource is associated with a starting resource block index.

27. The method of claim 26, wherein the starting resource block index is cell specific.

28. A non-transitory computer-readable medium storing a set of instructions for wireless communication, the set of instructions comprising:
one or more instructions that, when executed by one or more processors of a user equipment (UE), cause the UE to:
determine a physical uplink control channel (PUCCH) resource, for transmitting a hybrid automatic repeat request acknowledgment (HARQ-ACK) message, using a resource selection procedure from a plurality of resource selection procedures to identify a resource allocation of the PUCCH resource,
wherein the plurality of resource selection procedures comprises a first resource selection procedure used before a radio resource control setup is received and a second resource selection procedure,
wherein the resource selection procedure is the first resource selection procedure or the second resource selection procedure,
wherein the first resource selection procedure includes selecting a value, from a table and based on a remaining minimum system information (RMSI) value, that corresponds to a resource set that includes the PUCCH resource,
wherein a resource block offset corresponds to the RMSI value, and
wherein the second resource selection procedure comprises using an implicit resource mapping procedure, based at least in part on a control channel element (CCE) index of a physical downlink control channel (PDCCH), and explicit signaling comprising a PUCCH indicator; and
transmit the HARQ-ACK message using the PUCCH resource.

29. The non-transitory computer-readable medium of claim 28, wherein the RMSI value is a 4-bit parameter.

30. An apparatus for wireless communication, comprising:
means for determining a physical uplink control channel (PUCCH) resource, for transmitting a hybrid automatic repeat request acknowledgment (HARQ-ACK) message, using a resource selection procedure from a plurality of resource selection procedures to identify a resource allocation of the PUCCH resource,
wherein the plurality of resource selection procedures comprises a first resource selection procedure used before a radio resource control setup is received and a second resource selection procedure,
wherein the resource selection procedure is the first resource selection procedure or the second resource selection procedure,
wherein the first resource selection procedure includes selecting a value, from a table and based on a remaining minimum system information (RMSI) value, that corresponds to a resource set that includes the PUCCH resource, wherein a resource block offset corresponds to the RMSI value, and wherein the second resource selection procedure comprises using an implicit resource mapping procedure, based at least in part on a control channel element (CCE) index of a physical downlink control channel (PDCCH), and explicit signaling comprising a PUCCH indicator; and means for transmitting the HARQ-ACK message using the PUCCH resource.

31. The apparatus of claim 30, wherein the RMSI value is a 4-bit parameter.

32. The apparatus of claim 30, wherein the PUCCH resource is determined based on a resource block group offset identified based at least in part on the RMSI value.

33. The apparatus of claim 30, wherein the PUCCH resource is determined based on a quantity of PUCCH resources in a subset of PUCCH resources of a resource pool.

* * * * *